(12) United States Patent
Hoffman et al.

(10) Patent No.: US 6,978,271 B1
(45) Date of Patent: Dec. 20, 2005

(54) MECHANISM FOR CONTINUABLE CALLS TO PARTIALLY TRAVERSE A DYNAMIC GENERAL TREE

(75) Inventors: Philip M. Hoffman, Oreland, PA (US); Andrew David Milligan, Milton Keynes (GB); Robert K. Liermann, Downingtown, PA (US); Clark C. Kogen, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 789 days.

(21) Appl. No.: 10/003,586

(22) Filed: Oct. 29, 2001

Related U.S. Application Data (60) Provisional application No. 60/244,323, filed on Oct. 31, 2000.

(51) Int. Cl.[7] .............................................. G06F 17/30
(52) U.S. Cl. .............................. 707/101; 707/6; 707/7; 707/102; 711/100; 711/216
(58) Field of Search ........................... 707/3, 6–8, 100, 707/101–102; 711/100, 216

(56) References Cited

U.S. PATENT DOCUMENTS

| | | | |
|---|---|---|---|
| 4,823,310 A | * | 4/1989 | Grand ............................ 707/8 |
| 6,567,815 B1 | * | 5/2003 | Rubin et al. ................. 707/101 |
| 6,597,957 B1 | * | 7/2003 | Beakley .......................... 700/7 |
| 6,725,244 B1 | * | 4/2004 | Bonwick ..................... 707/205 |
| 6,728,955 B1 | * | 4/2004 | Berry et al. ................. 717/158 |

OTHER PUBLICATIONS

Dale et al., "Abstract Data Types: Specifications, Implementations, and Applications", Lexington, Mass. Jones & Bartlett publishers, Inc, 1996.*

Cleary et al., "Timestamp Representations for Virtual Sequences", Proceeding to the 11th workshop on Parallel and Distributed simulation, 1997, pp. 98-105.*

* cited by examiner

*Primary Examiner*—Khanh Pham
(74) *Attorney, Agent, or Firm*—Lise A. Rode; Mark T. Starr (57) ABSTRACT

Mechanisms and methods for traversing trees are disclosed. A novel data structure for modeling a node that includes a unique node counter also is described. In certain embodiments of the inventions the unique node counter is a timestamp of sufficient granularity to render each timestamp in the tree unique. A node counter, in conjunction with the lineage of a specified continuation node may be used to locate an appropriate starting point within a tree in a continuation call when the specified continuation node no longer exists in the tree.

19 Claims, 4 Drawing Sheets

MECHANISM FOR CONTINUABLE CALLS TO PARTIALLY TRAVERSE A DYNAMIC GENERAL TREE

I. CROSS REFERENCE TO RELATED APPLICATIONS

This application claims the benefit of U.S. Provisional Application Ser. No. 60/244,323, filed Oct. 31, 2000, the contents of which is fully incorporated herein by reference.

II. BACKGROUND

A. Field of the Invention

This invention relates generally to data storage and retrieval, and more particularly to data structures for storing and retrieving dynamic hierarchical strings and portions thereof.

B. Copyright Notice/Permission

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright. COPYRGT.2000–001, Unisys Corporation.

C. Description of the Related Art

A general tree is a data structure used to store and representing data stored and accessed by a computer program. Initially, a few definitions and concepts are in order:

Node—an element of a tree;
Root Node—a single node at level 0;
Child Node—a node at level 1 or greater descending from a parent node;
Parent Node—a node associated with a lower level node. Every child node has exactly 1 parent;
Sibling Nodes—nodes that are at the same level and share the same parent node;
Leaf Node—a node with 0 children;
Empty Tree—a tree consisting of 0 nodes;
General Tree—a set of nodes consisting of an empty tree or a root node and 0 or more subsets each of which is a tree;
Abstract Data Type Tree—general tree;
Forest—a set of 0 or more trees;
Binary Tree—a special type of general tree that consists of an empty tree or a root node and exactly 2 subsets each of which is a tree;
N-ary Tree—a special type of general tree that consists of an empty tree or a root node and exactly N subsets each of which is a tree;
Lineage—the path of nodes current node up to the root node (i.e., the node, its parent, its parent's parent, etc., up to the root node);
Level—the level of the root node is 0; the level of any other node is 1+the level of its parent (i.e., the level is the number of nodes in the lineage−1);
Traverse—an orderly way to visit each node in the tree exactly once in order to perform some operation on that node;
Preorder Traversal of a general tree—starting at the root node, 1) visit node, and 2) traverse each of the children subtrees;
Postorder Traversal of a general tree—starting at the root node, 1) traverse each of the children subtrees; and 2) visit node;
Preorder Traversal of a binary tree—starting at the root node, 1) visit node; 2) traverse left subtree, and 3) traverse right subtree;
Inorder Traversal of a binary tree—starting at the root node, 1) traverse left subtree, 2) visit node, and 3) traverse right subtree;
Postorder Traversal of a binary tree—starting at the root node, 1) traverse left subtree, 2) traverse right subtree, and 3) visit node.

A tree is a fundamentally hierarchical structure. As such, a tree may be used to represent any model that exhibits hierarchy, including but not limited to: process family structure; disk file directory structure; process priority scheduling queues; genealogical trees including family relationships among individuals, tribes, languages, and the like; classification systems including the Dewey decimal system, taxonomic classification of plants and animals, and the like; program structure including main program, procedures, nested procedures, and the like; and breakdown of a manufactured product or service.

Figure 1:
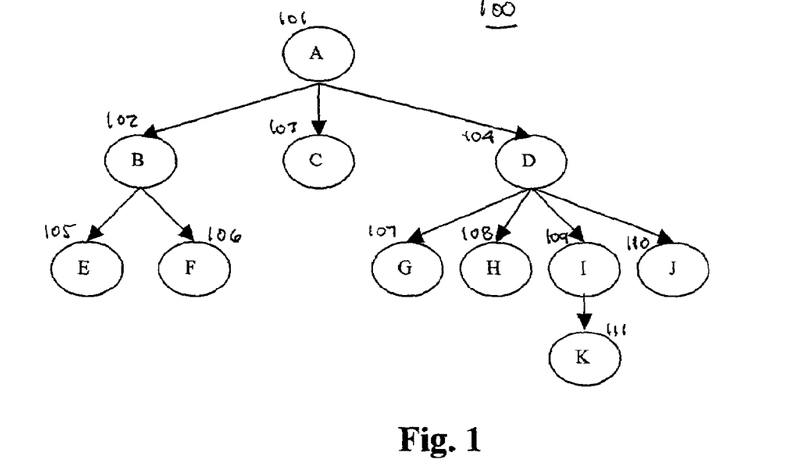
FIG. 1 depicts an exemplary general tree structure.
Figure 2:
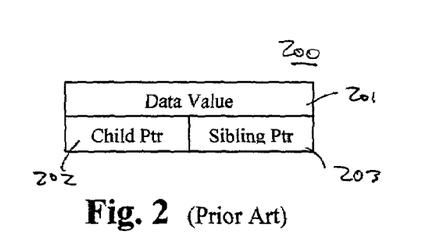
FIG. 2 illustrates a prior art general data structure for modeling a node in a general tree structure.
Figure 3:
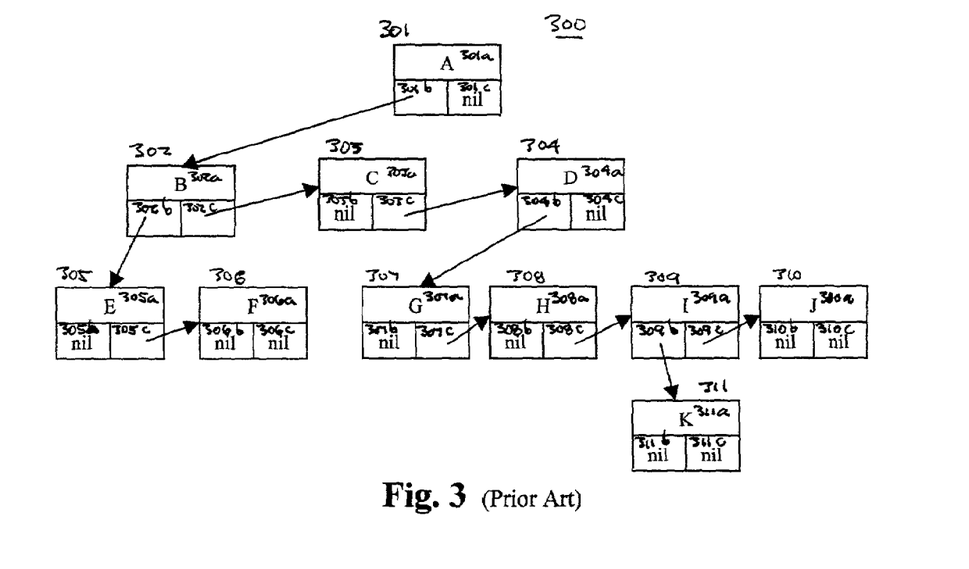
FIG. 3 depicts a binary tree representation of the general tree depicted in FIG. 1 utilizing the general data structure illustrated in FIG. 2.

FIGS. 1–3 will be used to illustrate an exemplary general tree, traversal of a general tree, implementation of a general tree as a binary tree using a prior art general data structure, and traversal of a binary tree using the prior art general data structure. Referring to FIG. 1, an exemplary general tree 100 is depicted. General tree 100 is comprised of root node A 101, children nodes B, C, D 102–04, grandchildren nodes E, F, G, H, I, J 105–10, and great-grandchild node K 111. Root node A is at level 0, children nodes B, C, D 102–4 are at level 1, grandchildren nodes E, F, G, H, I, J 105–10 are at level 2, and great-grandchild node K 111 is at level 3. A preorder traversal of general tree 100 would comprise visiting the foregoing nodes as follows: A 101, B 102, E 105, F 106, C 103, D 104, G 107, H 108, I109, K 111, J 110. A postorder traversal of general tree 100 would comprise visiting the foregoing nodes as follows: E 105, F 106, B 102, C 103, G 107, H 108, K 111, I 109, J 110, D 104, A 101.

General tree 100 may be used to represent a directory structure where a file exists for each leaf node E 105, F 106, C 103, G 107, H 108, K 111, I, and J 110. Preorder traversal of general tree 100 to retrieve all file names would yield: A\B\E; A\B\F; A\C; A\D\G; A\D\H; A\D\I\K; and A\D\J.

A binary tree can be used to represent a general tree. A binary tree is easily represented in programming languages as a uniform structure consisting of a plurality of general data structures, each general data structure comprising a node in the tree. FIG. 2 illustrates one such prior art general data structure 200 consisting of a data value field 201, a pointer reference to the first child node (the next generation) 202, and a pointer reference to the next sibling node (the current generation) 203.

FIG. 3 illustrates a binary tree 300 representation of the general tree 100 utilizing general data structure 200. Binary tree 300 is comprised of root node A 301, children nodes B, C, D 302–04, grandchildren nodes E, F, G, H, I, J 305–10, and great-grandchild node K 311. Nodes A–K 301–11 of binary tree 300 correspond directly to nodes A–K 101–11 of general tree 100. A preorder traversal of binary tree 100 would comprise visiting the foregoing nodes as follows: A 301, B 302, E 305, F 306, C 303, D 304, G 307, H 308, I309, K 311, J 310. A postorder traversal of binary tree 300 would comprise visiting the foregoing nodes as follows: F 306, E 305, K 311, J 310, I309, H 308, G 307, D 304, C 303, B 302, A 301. An inorder traversal of binary tree 300 would comprise visiting the foregoing nodes as follows: E 305, F 306, B 302, C 303, G 307, H 308, K 311, I 309, J 310, D 304, A 301.

Note that when comparing tree traversal for general tree 100 versus traversal of binary tree 300, which represents general tree 100, the following characteristics can be observed: preorder traversal of a general tree is the same as preorder traversal of the binary tree that represents the general tree; postorder traversal of a general tree is the same as inorder traversal of the binary tree that represents the general tree; and there is no traversal of a general tree that corresponds to postorder traversal of the binary tree that represents the general tree.

It is known in the art of computer programming to traverse tree structures as described above, for example to access or update data stored in the tree, or to add or delete tree nodes at some location in the tree. For example, in a multi-processing computer system, such as a mainframe, one process running in the system may build a tree containing data related to all other processes running concurrently in the system. Another process may need to traverse that tree to display the status of all or some of the running processes. For large trees however, the data structures and algorithms used to build, maintain, and traverse trees today often do not scale well. This lack of scalability can be a major disadvantage as computer systems grow in size and complexity, and as more workload is imposed on the systems. In extreme cases, the processor time required to traverse the tree can exceed the time required to process the data extracted from the tree. Considering the above two-process example in the context of a large process tree, the traversal/status process itself may require a dedicated processor, thereby unnecessarily increasing the cost and complexity of the overall system.

As a specific instance of the general example discussed above, consider the scalability of the data structures and algorithms used to build, maintain, and traverse trees in the A-Series mainframe computer systems, available from Unisys Corporation, Blue Bell, Pa. When a user establishes a session or starts a job on the A-Series, this process spawns children processes. The children in turn may spawn further processes. The entire set of processes associated with a session or a job is known as a process family and the A-Series operating system organizes them in a parent-child hierarchy. The data structure used by the A-Series operating system to organize process families in this parent-child structure is a binary representation of a general tree. The following Table 1 is an exemplary output for the J operator command for a single process family:

TABLE 1

| Mix-Pri | JOB ENTRIES |
|---|---|
| 59641 50 | Lib *SYSTEM/JAVASERVLETLIB ON JAVATEST |
| 59646 50 | SERVLET/API/PROCESS/NEW/REQUESTS |
| 59645 50 | *OBJECT/JAVA ON JAVATEST |
| 59661 50 | P59645/9/1/"TimerThread" |
| 59660 50 | P59645/8/1/"Worker2" |
| 59659 50 | P59645/7/1/AWAITING_REUSE |
| 59657 50 | P59645/6/1/"Thread-0" |
| 59655 50 | P59645/5/1/"SessionMgrThread" |
| 59651 50 | P59645/4/1/"Finalizer" |
| 59650 50 | P59645/3/1/"Reference Handler" |
| 59649 50 | P59645/2/1/"Signal dispatcher" |

The exemplary J operator output shows that the library job process, *SYSTEM/JAVASERVLETLIB ON JAVATEST, spawned 2 child processes—SERVLET/API/PROCESS/NEW/REQUESTS and *OBJECT/JAVA ON JAVATEST. The first child process had no offspring while the second child process spawned 8 child processes (grandchildren of the library job process *SYSTEM/JAVASERVLETLIB ON JAVATEST).

On early A-Series systems, the maximum number of active processes contending for processor resources is 4095. With the development of the Clearpath® NX5820 and NX6820 A-Series mainframe computer systems, also available from Unisys, the limit on the number of processes contending for the processor increased to 32,767. This increase brought to light an algorithmic performance problem related to the operating system CONTROLLER process monitoring the state of so many processes. Information returned by the CONTROLLER process is displayed on A-Series operator display terminals (ODTs). Affected operator commands used to display process status included J (job structure view of processes), A (active processes), W (processes waiting for operator action), S (processes scheduled for execution), DBS (database processes), and LIBS (library processes).

With an A-Series system, the CONTROLLER process is responsible for periodically updating and displaying process state system-wide. Each periodic update displays status for up to 22 processes. The next periodic update picks up where the previous update left off. The A-Series CONTROLLER process did not scale for a very large number of active processes because each display of updated process status information required a status picture of the entire process family tree (a general tree) to be built. For a system that has only 50 active processes, the effort to build the status picture of the process family tree is rather insignificant when displaying status information for only 22 of these processes. However, for a system that has 32,000 active processes, the effort to build the status picture of the entire process family tree is very significant when, for example, only 22 of these items will be displayed.

Previously, when the total number of concurrently active processes was low (less than 500), the CONTROLLER process required less than 6% of the processor power of a single processor to display process state at the ODTs. When the total number of concurrently active processes increased to 8,000, the CONTROLLER process consumed an entire processor just to display process state. When the total number of concurrently active processes increased to 32,000, the CONTROLLER process consumed an entire processor to display process state and could not keep up with the requested display refresh rates. When the CONTROLLER process was asked to sort active processes by CPU rate, the CONTROLLER process could only display process state information in intervals of several minutes.

Accordingly, a clear need exists in the art for a method of traversing extremely large trees efficiently while providing the scalability demanded by continuing advances in computer systems technology.

III. SUMMARY OF THE INVENTION

The present invention provides a mechanism where preorder traversal of a general tree can start and stop at any point in that tree. Thus, when a mainframe operating system wants to display status information for a subset of the active processes in the system all that is required is the creation of a partial family tree containing the relevant processes. For instance, because the A-Series CONTROLLER process displays status information for only 22 processes at a time, with the present invention a status picture of a partial family tree consisting of 22 processes is all that the operating system need generate. At the next periodic update of process state, the present invention provides a mechanism where the status picture can pick up just after the last process that was displayed in the previous status display update.

Another example of how the present invention may be utilized involves file directories. If, for example, a file directory structure as stored on a disk is represented by a general tree, one could use the present invention to access individual files and have a way of indicating where to retrieve the next file. This type of operation may be useful in any number of settings, including but not limited to, displaying all files on a disk, virus checking all files on a disk, searching all files on a disk for a specific text string, and the like, because the computer system would not have to build the entire disk directory structure before starting these operations.

The present invention provides a mechanism for traversing a general tree and comprises at least two items. First, a novel data structure for modeling a node that includes a unique node counter. In one embodiment of the invention the unique node counter comprises a timestamp of sufficient granularity to render each timestamp in the tree unique. The node counter is used to locate the correct starting point within a tree in a continuation call when the specified continuation node no longer exists. Second, certain portions of each node in the entire branch, typically referred to as a lineage, for the specified continuation node is required. At a minimum, the lineage for a particular node comprises the counter value, sibling pointer, and level of the node, its parent, its parent's parent, and so on all the way to the root node in the tree. In certain embodiments of the invention the data structure for modeling a node may include a parent pointer (i.e., a pointer that points backwards to the parent node of the modeled node). While a parent pointer is not required for continuation call traversals of a tree, most node structures employed for modeling tree structures would include this pointer because of its many uses in other tree operations.

The invention comprises a computer-readable medium having stored thereon a data structure for managing a plurality of elements related by hierarchy, the data structure representing one of the elements and comprising a data value field, a child pointer field, a sibling pointer field, and a unique counter field. The computer-readable medium may further comprise a parent pointer field and/or a data value field.

The invention also comprises a method for locating an updated continuation node in a dynamic binary tree formed by a family of nodes, each node in the family comprising a child pointer, a sibling pointer, and a unique counter value, the method comprising receiving as an input a continuation node and an abbreviated lineage for the continuation node; and traversing the nodes in the tree along the abbreviated lineage until the counter value indicates that a first valid node beyond the continuation node has been reached. The foregoing steps may be performed in a first native data environment and the updated continuation node passed to second process in a second non-native data environment.

The invention may further comprise a method for continuing a preorder traversal of a binary tree formed by a family of nodes, each node in the family comprising a child pointer, a sibling pointer, and a unique counter value, the method comprising receiving as an input a continuation node and a lineage for the continuation node, the continuation node and lineage comprising an output of a first partial preorder traversal of the binary tree, locating an updated continuation node in the binary tree by comparing the unique counter values of the family of nodes to a current node, the continuation node comprising the first current node, and continuing the preorder traversal of the binary tree from the updated continuation node.

III. BRIEF DESCRIPTION OF THE DRAWINGS

These and other features, aspects, and advantages of the invention will become better understood in connection with the appended claims and the following description and drawings of various embodiments of the invention where:

IV. DETAILED DESCRIPTION OF THE PREFERRED EMBODIMENTS

Throughout the following detailed description similar reference numbers refer to similar elements in all the figures of the drawings.

Data Structure

Figure 4:
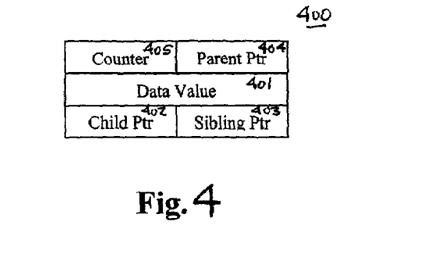
FIG. 4 illustrates a novel data structure for modeling a node in a general tree structure according to one embodiment of the present invention.

FIG. 4 illustrates a novel data structure 400 for modeling a node in a general tree structure according to one embodiment of the present invention. Data structure 400 is comprised of a data value field 401, child pointer field 402, sibling pointer field 403, a counter field 405, and a parent pointer field 404. Data value 401, child pointer 402, and sibling pointer 403 fields correspond to the data value 201, child pointer 202, and sibling pointer 203 fields of prior art data structure 200. In order to support continuable calls for partial traversal of a dynamic tree, counter 405 must be of sufficient granularity to ensure it has a unique value for each node within the tree to be modeled. Having an ordered unique value associated with each node in the tree allows one to locate the node from which to start the next partial traverse of the tree when the last node visited in a previous call no longer exists. As mentioned above, while parent pointer 404 field is not required to support continuable calls it has many other beneficial uses in the art.

Figure 5:
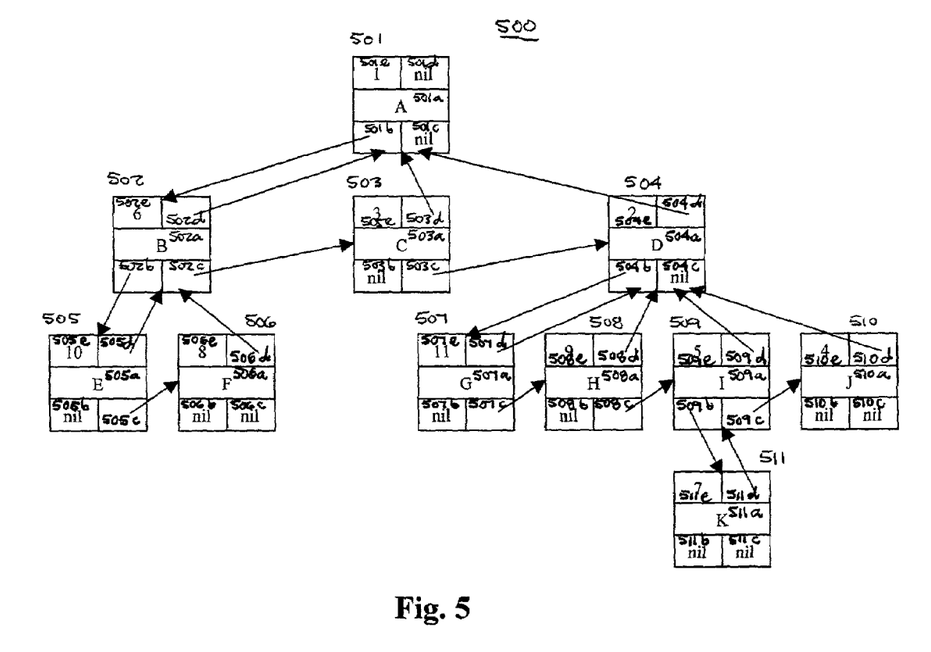
FIG. 5 depicts a binary tree representation of the general tree depicted in FIG. 1 utilizing the novel data structure illustrated in FIG. 4.

FIG. 5 depicts a binary tree representation 500 of the general tree 100 depicted in FIG. 1 utilizing the novel data structure 400 illustrated in FIG. 4. Note that for binary tree 500 the unique counter field 501e–511e for each node structure 501–511 provides some order. Each time a node was created the counter field value was incremented. From this structure, where a non-decreasing node counter was used, one can appreciate that the order of insertion for nodes 501–511 was: 501 A, 504 D, 503 C, 510 J, 509 I, 502 B, 511 K, 506 F, 508 H, 505 E, 507 G. Note also that with the use of a non-decreasing counter all children of a specific node (the child node and all sibling nodes at the same level) have decreasing counter field values as one moves to the right through the sibling nodes at that level. The latter point is important for external traversal of this tree type because the linear ordering of sibling nodes allows for detection of where to pick up when the continuation node has been deleted in between calls for partial traversal of the trees.

Methodology

As discussed above, the process that owns a tree data structure (i.e., in the process's data environment) can perform a number of fundamental operations and functions on the tree such as: creating a root node (Create_Root_Node (root_ptr, node_value)); inserting a new node (Insert_Node (parent_ptr, node_value)); deleting a node (Delete_Node (node_ptr)); preorder traversal of the general tree represented by the binary tree data structure (Preorder_Traverse_Tree (root_ptr)); postorder traversal of the general tree represented by the binary data structure (Postorder_Traverse_Tree (root_ptr), and the like. Because the implementation of such operations and functions would be known by one skilled in the art they are either discussed briefly below and/or illustrated in pseudo-code attached hereto.

Creation of a root node in a tree data structure is illustrated in the procedure Create_Root_Node (root_ptr, node_value), attached hereto in the form of pseudo-code as Appendix A.

Insertion of a node into a tree data structure is illustrated in the procedure Insert_Node (parent_ptr, node_value) attached hereto in the form of pseudo-code as Appendix B. Note that each time a node is inserted into the tree the global node counter is incremented and the new node becomes the child node, while the previously linked children node(s) get pushed to the front of the sibling node chain. This implies some type of ordering. If the global node counter is incremented, the child node and all sibling nodes have an associated node counter value that is decreasing when following the sibling links. Conversely, if the global node counter is decreasing, the child node and all sibling nodes have an associated node counter value that is increasing when following the sibling links.

Deletion of a node from a tree data structure is illustrated in the procedure Delete_Node (node_ptr) attached hereto in the form of pseudo-code as Appendices C1 and C2. Two versions of the procedure are shown to highlight differences on how to handle deleting a node that has offspring. The first version of procedure illustrated in Appendix C1 requires that the node being deleted have no offspring nodes. The second version of procedure illustrated in Appendix C2 has a recursive implementation where a node and its entire offspring are deleted. To delete a node and all of its offspring nodes, a recursive post-order traversal of the offspring tree is shown.

Traversal of general trees in the environment in which they reside is straightforward and illustrated in the procedures Preorder_Traverse_Tree (root_ptr) and Postorder_Traverse_Tree (root_ptr) attached hereto in the form of pseudo-code as Appendices D and E respectively. Note that recursive versions of the traversal processes are shown. One skilled in the art will appreciate that recursion can be eliminated through the use of recursion simulation stacks. Note also that the Postorder_Traverse_Tree procedure utilizes an inorder traversal of the binary tree data structure that represents the general tree.

Turning now to embodiments of the invention involving traversal of general trees by external processes, a mechanism for performing continuing calls on dynamic tree data structures residing in another environment will be shown and described. In other words, a mechanism will be discussed where an external or calling process may periodically retrieve snapshots of a dynamic tree data structure that is not in the calling process's data environment. In accordance with the invention, to accomplish the foregoing the calling process must pass two structures as input to the process owning the data tree structure (i.e., the native process): a pointer to a node within the data tree where traversal should continue from (hereinafter the "continuation pointer" or "continuation node"); and that portion of the continuation pointer's lineage comprising the counter value and level for each node in the full lineage of the continuation pointer (hereinafter the "abbreviated continuation node lineage"). Information beyond the continuation pointer and the abbreviated continuation pointer lineage also may be passed by the calling process to the native process, such as the full continuation pointer lineage, the entire array structure or partial tree data structure returned by the native process to the calling process in the preceding call, and the like. However, the continuation pointer and its abbreviated lineage is all that is required to enable continuing partial preorder traversal in accordance with the invention.

Figure 6A:
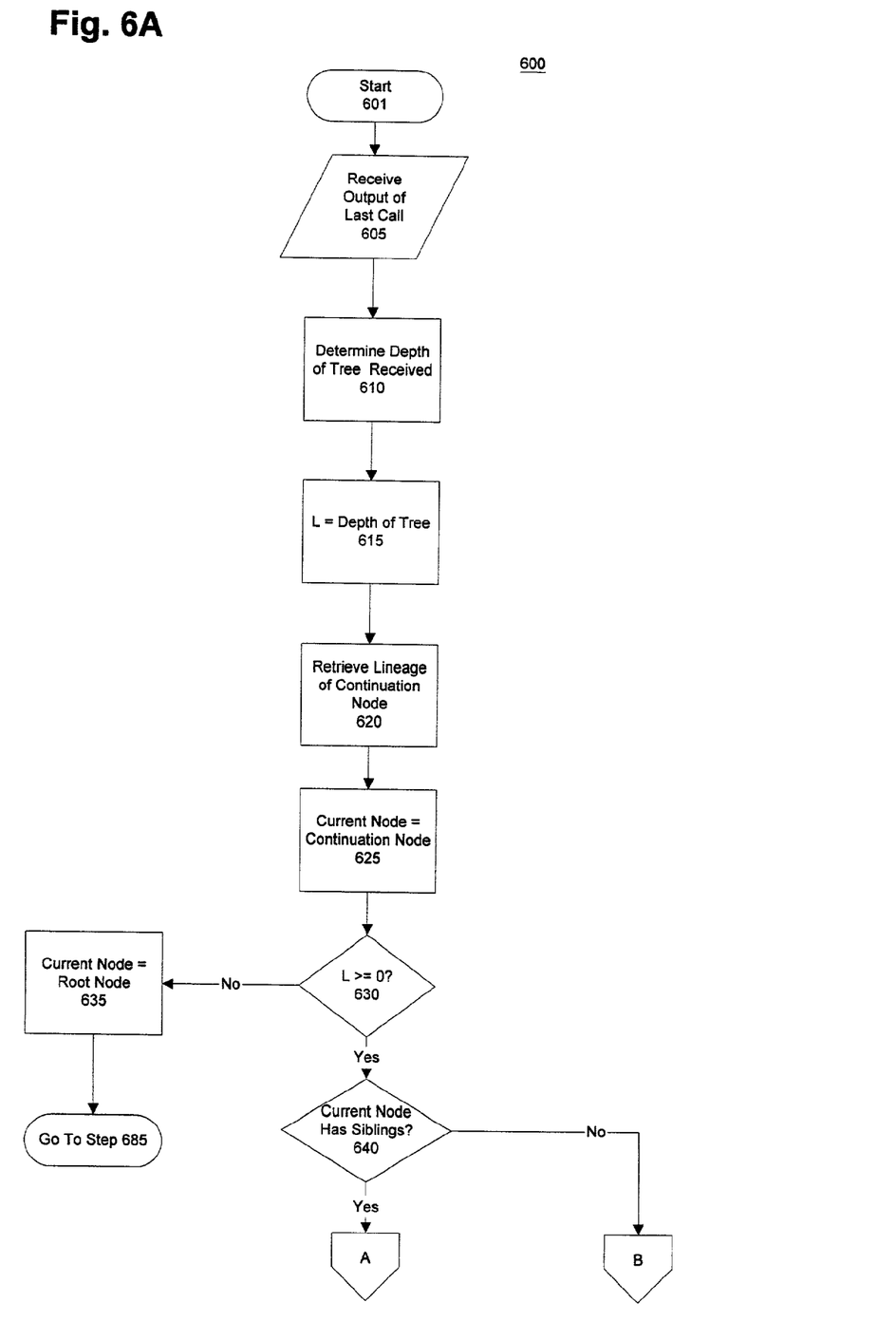
FIGS. 6A and 6B illustrate in flow diagram form a method for locating an updated continuation node in accordance with an embodiment of the present invention.
Figure 6B:
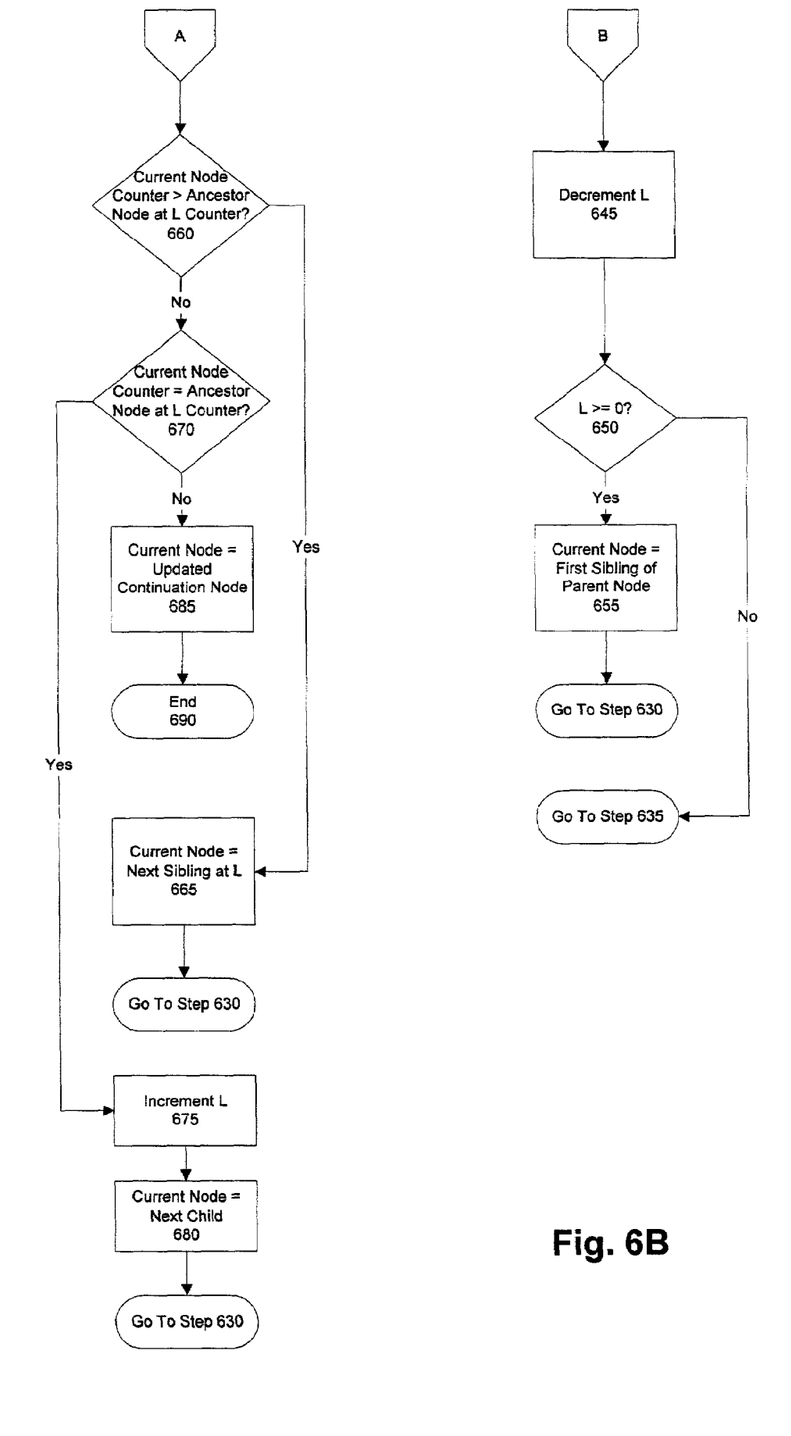

FIG. 6 depicts in flow diagram form a method 600 of locating an updated continuation node (i.e., the node in a dynamic binary tree from which to continue a partial preorder traversal) in accordance with an embodiment of the present invention. Pseudo-code illustrating an implementation of method 600 is attached hereto as Appendix F as well. The Find_First_Node procedure illustrated in Appendix F processes the external array lineage received from the calling process to determine the node from which to continue. The procedure first determines the level of the continuation node received from the calling process before constructing the recursion simulation stack (int_pointers). The main loop that builds the recursion simulation stack (WHILE seeking DO) compares nodes in the externally specified nodes (ext_nodes) versus the associated internal nodes (nodes). If nodes are determined to be matching (the node counters are equal), the level is incremented and the current pointer points to the associated child node. The counter values in the individual nodes are ordered (see procedure Insert_Node attached hereto as Appendix B). In this embodiment an incrementing global node counter results in a decreasing counter value as one follows the sibling node chain. Thus, one can follow the sibling links to determine where the specified node fits. While following links (child or sibling links), if the associated link is nil (not linked to a node), then the level is decremented and the current node pointer points to the next sibling node. The main loop is complete when the level is decremented to −1 (initial traversal call or traversal of the tree is complete) or the appropriate continuation point is found.

Referring now to FIG. 6, method 600 begins in step 601 when an external process calls an interface to a data environment in which a dynamic binary tree resides. In step 605 process 600 receives the array of nodes forming the output of the last partial traversal of the tree. In step 610 the process determines the depth of the partial tree formed by the nodes received in step 605. In step 615 the process sets the current level, L, equal to the depth of the partial tree ascertained in step 610. In step 620 the process retrieves the lineage of the continuation node from the array of nodes received in step 605 and populates the internal array ancestor_nodes with the nodes formed by the lineage. In step 625 the process sets the variable current node equal to the continuation node received in step 605.

In step 630 the process determines if the current level is greater than or equal to zero. If no, in step 635 the process sets the variable current node equal to the root node in the tree and proceeds to step 685. If yes, in step 640 the process determines whether the current node has any siblings. If the current node has no siblings, in step 645 the process decrements the current level by 1 and proceeds to step 650. In step 650 the process determines whether the current level is greater than or equal to zero. If the determination in step 650 is No the process returns to step 635. If the determination in step 650 is Yes the process sets the current node equal to the first sibling of the existing current node's parent and returns to step 630.

If the process determines in step 640 that the current node has siblings, the process advances to step 660. In step 660 the process determines whether the counter value of the current node is greater than the counter value of the ancestor node at the current level. If the determination in step 660 is Yes, in step 665 the process sets the current node equal to the next sibling at the current level and returns to step 630. If the determination in step 660 is No, the process proceeds to step 670.

In step 670 the process determines whether the counter value of the current node equals the counter value of the ancestor node at the current level. If No, in step 685 the process designates the current node as the updated continuation node and advances to step 690 where it ends (or returns the updated continuation node to the calling process or interface). If the outcome of the determination in step 670 is Yes, the process increments the current level by 1 in step 675 and advances to step 680. In step 680 the process sets the current node equal to the next child node and returns to step 630.

Returning subtrees for partial preorder traversal of nodes can be achieved using step-wise (single node) and multiple node operations. Multiple node operations may be used for partial preorder traversal because the corresponding internal interface that returns preorder nodes must visit each parent node before visiting any associated children. The internal procedures for supporting two external interfaces defined to partially preorder traverse dynamic general trees, Single_Step_Preorder_Traverse_Tree (ext_node_ptr, ext_nodes) and Partial_Preorder_Traverse_Tree (ext_node_ptr, ext_nodes), are illustrated in the form of pseudo-code attached hereto as Appendix G.

The nodes returned in the ext_nodes array minimally require 3 fields when single-stepping through the traversal (node value, parent pointer, and node counter value). When performing a partial preorder traversal of nodes, 2 more fields are required for the external program to continue traversal (child pointer and sibling pointer). Most applications generally require the complete node structure and linkage, and so that is what is depicted in the pseudocode examples.

The parameters for the Single_Step_Preorder_Traverse_Tree and Partial_Preorder_Traverse_Tree interface procedures are defined in a manner that is used as both input to the internal or native procedures supporting traversal and output results that contain the partial tree structure. For example, if these procedures are called with the ext_node_ptr parameter set to a nil value (as defined by the internal structure), the resulting ext_nodes parameter contains a partial tree that starts with the node at the root_ptr of the internal tree and the resulting ext_node_ptr points to the last node in the tree that was inserted. As an external process consumes nodes, it is responsible for updating the external node pointer value (ext_node_ptr) so that subsequent calls on this interface return the next set of nodes. When using the single step version of this traversal (Single_Step_Preorder_Traverse_Tree), update of ext_node_ptr is not necessary.

Regarding implementation of the present invention on the Unisys A-Series MCP operating systems, the CONTROLLER process discussed above utilizes the foregoing interface procedures with GETSTATUS Type 6 Subtype 13 calls to retrieve process family information. The CONTROLLER process requests a subset of the process family information (a partial general tree) and consumes an even smaller subset of the retrieved information. For subsequent process family display requests, the CONTROLLER process sets up a specific process lineage (the last one displayed) and a pointer to that information as part of the next call to the GETSTATUS Type 6 Subtype 13 interface.

The Single_Step_Preorder_Traverse_Tree and Partial_Preorder_Traverse_Tree interface procedures require several underlying procedures to accomplish the preorder traversal. The first underlying procedure, Find_First_Node, is discussed in connection with FIG. 6 and Appendix F above. The other procedures are within the knowledge of one skilled in the art and therefore discussed only briefly below.

Another underlying procedure that supports preorder traversal with the interface procedures discussed above is a procedure for locating the next node in an internal tree. One implementation of this procedure, Find_Next_Node (level, int_pointers, ext_pointers), is illustrated in the form of pseudo-code attached hereto as Appendix H. Note that because the interface procedures illustrated in Appendix G pass the lineage of the continuation node to the Find_First_Node and Find_Next_Node procedures, and this lineage is analogous to a recursion simulation stack that is used to eliminate recursive procedure calls, the underlying internal procedures Find_First_Node and Find_Next_Node use non-recursive techniques to traverse the internal general tree.

The procedure Find_Next_Node continues a preorder traversal of the internal tree using a recursion simulation stack (int_pointers). The procedure traverses the tree by following the child link. If a child link is nil (i.e., a child node does not exist), the level is decremented and traversal continues by following the sibling link. If no sibling nodes exist at that level, the level is decremented and the procedure follows that sibling link. The traversal ends when the level is decremented to −1.

Insert_First_Lineage (ext_node_ptr, ext_ptr, ext_nodes ext_pointers, level, int_pointers), illustrated in pseudo-code attached hereto as Appendix I, is another underlying procedure supporting the Single_Step_Preorder_Traverse_Tree and Partial_Preorder_Traverse_Tree interface procedures. The procedure follows the entire recursion simulation stack (int_pointers) and builds the associated external tree nodes. Note that the external tree nodes contain links to parent nodes, children nodes, and sibling nodes that may have to be "fixed" as the external pointers may be different from the internal pointers. A special flag is defined for a pointer value to a node that has not yet been visited in the internal traversal, the "inuse" flag value. Thus, with this procedure external node pointers may have 3 different types of values: a pointer to an existing node, a nil pointer (no node exists), and an inuse flag pointer (node exists internally but has not been inserted into the external partial tree). After creating the external nodes (ext_nodes), the procedure sets the external node pointer (ext_node_ptr) to point to the specific node from which to continue tree traversal.

The last underlying procedure supporting the Single_Step_Preorder_Traverse_Tree and Partial_Preorder_Traverse_Tree interface procedures, Insert_Next_Node (ext_ptr, ext_nodes, ext_pointers, level, int_pointers), is illustrated in pseudo-code form attached hereto as Appendix J. The Insert_Next_Node procedure builds an external tree node. Note that like the Insert_First_Lineage procedure, the external node built by the Insert_Next_Node procedure contains links to a parent node, a child node, and a sibling node that may have to be "fixed" as the external pointers may be different from the internal pointers. Also, nodes that point to this node (either the parent's child node pointer or a sibling node at the same level) may have to be "fixed" as well to correspond to the external node locations.

It should be noted also that the present invention does not utilize a native ordering scheme. For example, it is known in the art of computer programming that file directories can be organized by native ordering schemes such as the alphanumeric names of the files themselves. The present invention employs an ordering scheme that is independent of the data value field stored in any of the individual nodes. The present invention is therefore much more flexible and powerful than a native ordering scheme.

In general, the following points regarding the present invention should be kept in mind. First, the mechanism of the present invention is particularly suited to an environment where the process that requires preorder tree traversal is not the process that "owns" the tree data structure. For example, in the Unisys A-Series mainframe computer systems the CONTROLLER process displays process status information while the A-Series MCP KERNEL process, for instance, may contain a process tree structure traversed by the CONTROLLER process. Second, the tree structures traversed by the present invention need not be static and most often will be dynamic. In other words, nodes within the trees may have been created and/or destroyed in between calls to retrieve portions of the tree structure. Finally, the tree structures traversed by the present invention may be very large. Without the mechanism provided by the invention a process that consumes tree nodes may require frequent updates of the entire tree structure to prevent the node information from becoming stale. This often requires a substantial amount of data to be retrieved and transferred by the system while only a relatively small amount of data is actually consumed.

Utilizing an embodiment of the present invention, the following Table 2 illustrates the reduced CPU utilization realized by the CONTROLLER process on a Unisys NX5820 A-Series system:

TABLE 2

CONTROLLER Update of Active Process Status Every 5 Seconds - ADM (ACTIVE 21) DELAY 5

| Number of Active Processes | CPU Utilization Prior to the Invention | CPU Utilization After the Invention |
|---|---|---|
| 500 | 6% | 1% |
| 8000 | 100% | 1% |
| 32000 | Could not do | 1% |

While the invention has been described in connection with the embodiments depicted in the various figures and appendices, it is to be understood that other embodiments may be used or modifications and additions may be made to the described embodiments without deviating from the spirit of the invention. Therefore, the invention should not be limited to any single embodiment whether depicted in the figures and/or appendices or not. Rather, the invention should be construed to have the breadth and scope accorded by the claims appended below.

We claim:

1. A computer implemented method for continuing a preorder traversal of a binary tree formed by a family of node when a last node visited in a first partial traversal no longer exists in the tree, each node in the family comprising a child pointer, a sibling pointer, and a unique counter value, the method comprising:

receiving as input a continuation node and a lineage of the continuation node, the continuation node comprising the last node visited in the first partial traversal;

determining an updated continuation node by locating a first node currently existing in the tree included in the lineage of the continuation node having a level higher than any other nodes currently existing in the tree included in the lineage of the continuation node, the updated continuation node comprising the first currently existing node; and continuing the preorder traversal of the tree from the updated continuation node wherein the determining step comprises comparing unique counter values of nodes currently existing in the tree with the continuation node unique counter value.

2. The method of claim 1 wherein the determining step follows the lineage of the continuation node.

3. The method of claim 1 wherein the binary tree comprises a dynamic binary tree.

4. The method of claim 1 wherein the binary tree represents a general tree.

5. The method of claim 1 wherein the binary tree represents a family of related processes.

6. The method of claim 1 wherein the binary tree represents a disk file directory structure.

7. The method of claim 1 wherein the binary tree represents a computer program structure.

8. The method of claim 1 wherein the nodes in the family further comprise a parent pointer.

9. The method of claim 1 wherein the lineage of the continuation node received as the input is abbreviated.

10. The method of claim 1 wherein the binary tree resides in a first environment and the input is received from a second distinct environment.

11. A computer implemented method for locating an updated continuation node in a dynamic binary tree formed by a family of nodes when a last node visited in a first partial traversal of the tree no longer exists, each node in the family comprising a child pointer, a sibling pointer, and a unique counter value, the method comprising:

(a) receiving as input a continuation node and an abbreviated lineage for the continuation node, the continuation node comprising the last node visited in the first partial traversal of the tree; and (b) traversing the nodes in the tree along the abbreviated lineage until the counter value indicates that a first valid node beyond the continuation node has been reached;

wherein the step (b) comprises:

(b)(1) determining whether the continuation node has a depth equal to or less than zero; and (b)(2) if the result of step (b)(1) is no, traversing the nodes in the tree along the abbreviated lines until the counter value indicates that a first valid node beyond the continuation node has been reached.

12. The method of claim 11 wherein steps (a) and (b) are performed in a first data environment and the input is received from a second process in a second non-native data environment.

13. The method of claim 12 further comprising:
(c) passing as an output the updated continuation node to the second process.

14. The method of claim 11 wherein step (a) comprises:
(a)(1) receiving as input a continuation node and a lineage for the continuation node; and
(a)(2) extracting an abbreviated lineage for the continuation node from the continuation node lineage.

15. The method of claim 11 wherein the binary tree represents a general tree.

16. The method of claim 11 wherein the binary tree represents a family of related processes.

17. The method of claim 11 wherein the binary tree represents a disk file directory structure.

18. The method of claim 11 wherein the binary tree represents a computer program structure.

19. The method of claim 11 wherein the nodes in the family further comprise a parent pointer.

* * * * *